United States Patent
Wu et al.

(10) Patent No.: US 11,478,966 B2
(45) Date of Patent: Oct. 25, 2022

(54) COMPOSITE PLATE STRUCTURE AND MANUFACTURING METHOD THEREOF

(71) Applicants: Jung-Chin Wu, Taipei (TW); Po-An Lin, Taipei (TW); Sheng-Hung Lee, Taipei (TW); Han-Ching Huang, Taipei (TW); Kuo-Nan Ling, Taipei (TW)

(72) Inventors: Jung-Chin Wu, Taipei (TW); Po-An Lin, Taipei (TW); Sheng-Hung Lee, Taipei (TW); Han-Ching Huang, Taipei (TW); Kuo-Nan Ling, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 16/726,170

(22) Filed: Dec. 23, 2019

(65) Prior Publication Data
US 2020/0130243 A1 Apr. 30, 2020

Related U.S. Application Data

(63) Continuation of application No. 14/714,354, filed on May 18, 2015, now abandoned.
(Continued)

(51) Int. Cl.
*B29K 105/08* (2006.01)
*B29L 31/34* (2006.01)
*B29C 45/14* (2006.01)

(52) U.S. Cl.
CPC .. *B29C 45/14311* (2013.01); *B29C 45/14786* (2013.01); *B29K 2105/08* (2013.01);
(Continued)

(58) Field of Classification Search
CPC ..... Y10T 428/24149; Y10T 428/24157; Y10T 428/24165; Y10T 428/24777;
(Continued)

(56) References Cited

U.S. PATENT DOCUMENTS 3,890,108 A * 6/1975 Welsh ...................... B21D 7/06
428/593
2007/0101679 A1* 5/2007 Harthcock ........... B62D 29/002
52/782.1
(Continued)

FOREIGN PATENT DOCUMENTS

WO WO-0159311 A1 * 8/2001 ........... B62D 33/046

OTHER PUBLICATIONS

Machine translation (Espacenet) of WO 01/59311 A1. Translated Aug. 4, 2018. (Year: 2018).*

*Primary Examiner* — Frank J Vineis
*Assistant Examiner* — Ethan A. Utt
(74) *Attorney, Agent, or Firm* — JCIPRNET (57) ABSTRACT

A composite plate structure includes a composite plate and a resin component. The composite plate includes a first fiber layer, a second fiber layer and a core layer. The second fiber layer has a first region, wherein an area of the second fiber layer is smaller than an area of the first fiber layer. The core layer is disposed between the first fiber layer and the second fiber layer, wherein the core layer is exposed at the first region. The resin component is connected to the composite plate, wherein the resin component is combined with the core layer at the first region. In addition, a manufacturing method of the composite plate is also provided.

15 Claims, 6 Drawing Sheets

Related U.S. Application Data (60) Provisional application No. 62/089,813, filed on Dec. 9, 2014, provisional application No. 62/010,463, filed on Jun. 11, 2014.

(52) U.S. Cl.
CPC .............. *B29L 2031/3481* (2013.01); *Y10T 428/24752* (2015.01)

(58) Field of Classification Search
CPC ........... Y10T 428/24785; Y10T 428/23; Y10T 428/234; Y10T 428/236; Y10T 428/239; Y10T 428/24058; Y10T 428/24074; Y10T 428/24099; Y10T 428/24107; Y10T 428/24116; Y10T 428/24124; Y10T 428/24132; Y10T 428/249953; Y10T 428/249955; Y10T 428/249958; B32B 3/00; B32B 3/02; B32B 3/06; B32B 3/10; B32B 3/12; B32B 5/00; B32B 5/02; B32B 5/06; B32B 5/22; B32B 5/24; B32B 5/245; B32B 5/26; B32B 5/28; B32B 2457/00; B32B 2305/024; B29C 45/14; B29C 45/14336; B29C 45/14344; B29C 45/14409; B29C 2045/1436; B29C 2045/14368; B29C 33/00; B29C 33/003; B29C 33/02; B29C 33/026; B29C 33/10; B29C 33/12; B29C 33/123; B29C 45/00; B29C 45/0001; B29C 45/14008; B29C 45/14065; B29C 45/1418; B29C 45/14196; B29C 45/14467; B29C 45/14778; B29C 45/14795; B29C 45/14811; B29C 2045/1404; B29C 2045/14057; B29C 2045/14352; B29C 2045/14803; B29C 2045/14786; B29C 2045/14868; B29C 45/16; B29C 45/1642; B29C 70/00; B29C 70/003; B29C 70/04; B29C 70/06; B29C 70/08; B29C 70/68; B29C 70/681; B29C 70/682; B29C 70/683; B29C 70/74; B29C 70/76; B29C 70/763; B29C 70/84; B29C 70/845; H05K 5/00; H05K 5/02; H05K 5/0217; H05K 5/0243; H05K 5/03; G06F 1/00; G06F 1/16; G06F 1/1601; G06F 1/1613; G06F 1/1633; H04M 1/00; H04M 1/02; H04M 1/0202; H04M 1/0249; H04M 1/026; H04M 1/03; H04M 1/72; B29L 2009/00; B29L 2031/34; B29L 2031/3431; B29L 2031/3437; B29L 2031/3481; B29L 2031/60; B29L 2031/608; E04B 1/00; E04B 1/02; E04B 1/12; E04B 1/14; E04B 2103/00; E04B 2103/04; E04C 2/00; E04C 2/02; E04C 2/10; E04C 2/16; E04C 2/20; E04C 2/205; E04C 2/22; E04C 2/24; E04C 2/246; E04C 2/30; E04C 2/34; E04C 2/36; E04C 2/365; E04C 2/38; E04C 2/388; E04C 2/40
USPC ....... 428/116–118, 192, 193, 68, 72, 73, 76, 428/105, 107, 109–114, 304.4, 306.6, 428/308.4; 264/478, 510, 239, 241, 257, 264/259, 271.1, 273, 274, 275, 279, 264/279.1, 299, 319, 328.1, 328.2, 330, 264/331.11; 361/600, 679.01, 679.02, 361/679.55, 679.56; 455/73, 550.1, 455/575.1, 575.8; 52/309.1, 309.4, 309.6, 52/309.8, 309.9, 309.13, 309.14, 309.15, 52/578, 582.1, 782.1, 783.1, 793.1
See application file for complete search history.

(56) References Cited

U.S. PATENT DOCUMENTS

| | | | |
|---|---|---|---|
| 2009/0255204 A1* | 10/2009 | Schwartau | B29C 66/723 52/582.1 |
| 2011/0008566 A1* | 1/2011 | Okano | B32B 7/02 428/58 |
| 2012/0040135 A1* | 2/2012 | Werthen | B32B 3/12 428/138 |

* cited by examiner

COMPOSITE PLATE STRUCTURE AND MANUFACTURING METHOD THEREOF

CROSS-REFERENCE TO RELATED APPLICATION

This is a continuation application of and claims the priority benefit of a prior application Ser. No. 14/714,354 filed on May 18, 2015, now pending. The prior application Ser. No. 14/714,354 claims the priority benefits of U.S. provisional application Ser. No. 62/010,463, filed on Jun. 11, 2014, and U.S. provisional application Ser. No. 62/089,813, filed on Dec. 9, 2014. The entirety of each of the above-mentioned patent applications is hereby incorporated by reference herein and made a part of this specification.

BACKGROUND OF THE INVENTION

1. Field of the Invention

The invention generally relates to a composite plate structure and a manufacturing method thereof, and more particularly, to a composite plate structure having fiber layers and a manufacturing method thereof.

2. Description of Related Art

In recent years, portable electronic devices have been developed to provide more functions and have smaller sizes. Wireless communication and wireless network make it convenient for people to acquire information from the Internet via portable electronic devices, and as a result, portable electronic devices become common. In order to increase portability, portable electronic devices are made to be thinner and lighter. Composite materials composed of lighter materials, such as plastic, bamboo slices, carbon fibers or glass fibers, are used to manufacture the housing of portable electronic devices.

Portable electronic devices usually store a lot of data and applications. It will be inconvenient to carry the portable electronic devices if they do not have sufficient structural strength against shake or pressure. Thus, how to increase the structural strength of composite materials is an important issue in designing the housing for portable electronic devices

SUMMARY OF THE INVENTION

The invention is directed to a composite plate structure having a favorable structural strength.

The invention is directed to a manufacturing method of a composite plate structure, wherein the resulting composite plate structure has a favorable structural strength.

The composite plate structure of the invention includes a composite plate and a resin component. The composite plate includes a first fiber layer, a second fiber layer and a core layer. The second fiber layer has a first region, wherein an area of the second fiber layer is smaller than an area of the first fiber layer. The core layer is disposed between the first fiber layer and the second fiber layer, wherein the core layer is exposed at the first region. The resin component is connected to the composite plate, wherein the resin component is combined with the core layer at the first region.

In one embodiment of the invention, the composite plate has a sidewall, the core layer is exposed by the sidewall, and the resin component is connected to the sidewall.

In one embodiment of the invention, the composite plate has a peripheral edge, the peripheral edge has a plurality of recessed portions, the resin component has a plurality of protruding portions, and the protruding portions are respectively fitted into the recessed portions.

In one embodiment of the invention, the recessed portions are formed by a punching process.

In one embodiment of the invention, an extending direction of each of the recessed portions has an inclination angle relative to the peripheral edge.

In one embodiment of the invention, the inclination angle is between 10 to 170 degrees.

In one embodiment of the invention, a portion of the second fiber layer is removed to expose the core layer at the first region, the first region divides the second fiber layer into a second region and a third region, and the core layer at the second region and the third region is covered by the second fiber layer.

In one embodiment of the invention, an area of the second region is greater than an area of the third region.

In one embodiment of the invention, the composite plate has a peripheral edge, and the third region is adjacent to the peripheral edge.

In one embodiment of the invention, the portion of the second fiber layer is removed by a milling process, a laser perforation process, or a mechanical drilling process.

In one embodiment of the invention, a material of the first fiber layer and the second fiber layer includes carbon fibers, glass fibers, Kevlar fibers, synthetic fibers, or natural fibers.

In one embodiment of the invention, a material of the first fiber layer and the second fiber layer includes fiber yarn bundle mixed resin.

In one embodiment of the invention, the resin is a thermoplastic resin or a thermosetting resin.

In one embodiment of the invention, a material of the core layer includes plastic, bamboo slices, carbon fibers, glass fibers, synthetic fibers, or natural fibers.

In one embodiment of the invention, the second fiber layer is coplanar with the resin component located at the first region.

The manufacturing method of the composite plate structure of the invention includes the following steps. A composite plate is provided, wherein the composite plate includes a first fiber layer, a second fiber layer and a core layer, and the core layer is disposed between the first fiber layer and the second fiber layer. A portion of the second fiber layer is removed, so as to enable the core layer to be exposed at a first region of the second fiber layer. A melted resin is provided to the composite plate by an injection molding process, wherein a portion of the melted resin flows through the core layer exposed by the second fiber layer to a space between the first fiber layer and the second fiber layer, and the melted resin forms a resin component connected to the composite plate after being cured.

In one embodiment of the invention, the composite plate has a sidewall, the core layer is exposed by the sidewall, and the step of forming the resin component includes: connecting the resin component to the sidewall.

In one embodiment of the invention, the manufacturing method of the composite plate structure includes: forming a plurality of recessed portions at a peripheral edge of the composite plate, wherein the resin component has a plurality of protruding portions, and the protruding portions are respectively fitted into the recessed portions.

In one embodiment of the invention, the step of forming the recessed portions includes: forming the recessed portions by a punching process.

In one embodiment of the invention, an extending direction of each of the recessed portions has an inclination angle relative to the peripheral edge.

In one embodiment of the invention, the inclination angle is between 10 to 170 degrees.

In one embodiment of the invention, the first region divides the second fiber layer into a second region and a third region, and the core layer at the second region and the third region is covered by the second fiber layer.

In one embodiment of the invention, an area of the second region is greater than an area of the third region.

In one embodiment of the invention, the composite plate has a peripheral edge, and the third region is adjacent to the peripheral edge.

In one embodiment of the invention, the step of removing the portion of the second fiber layer includes: removing the portion of the second fiber layer by a milling process, a laser perforation process, or a mechanical drilling process.

In one embodiment of the invention, a material of the first fiber layer and the second fiber layer comprises carbon fibers, glass fibers, Kevlar fibers, synthetic fibers, or natural fibers.

In one embodiment of the invention, a material of the first fiber layer and the second fiber layer comprises fiber yarn bundle mixed resin.

In one embodiment of the invention, the resin is a thermoplastic resin or a thermosetting resin.

In one embodiment of the invention, a material of the core layer comprises plastic, bamboo slices, carbon fibers, glass fibers, synthetic fibers, or natural fibers.

In view of the above, in the composite plate of the invention, the core layer is exposed by the second fiber layer at the first region, so that the melted resin can flow through the core layer exposed by the second fiber layer to a space between the first fiber layer and the second fiber layer. As such, the resin component, which is formed after the melted resin is cured, is combined with the core layer, the first fiber layer and the second fiber layer at the first region, so as to strengthen binding forces of the core layer, the first fiber layer and the second fiber layer, and thereby enhances a structural strength of the composite plate structure.

In order to make the aforementioned features and advantages of the present invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
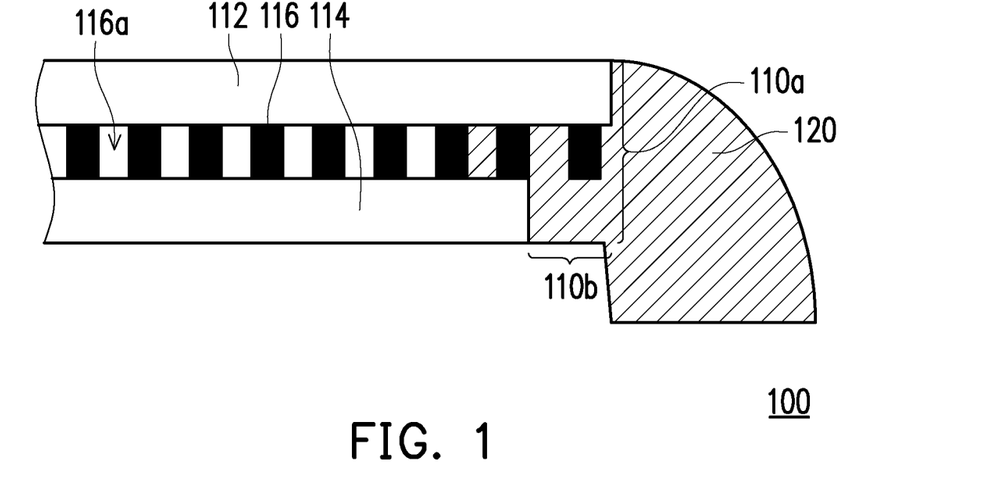
FIG. 1 is a schematic diagram illustrating a composite plate structure according to an embodiment of the invention.

FIG. 1 is a schematic diagram illustrating a composite plate structure according to an embodiment of the invention. Referring to FIG. 1, the composite plate structure 100 of the present embodiment includes a composite plate 110 and a resin component 120. The composite plate 110 includes a first fiber layer 112, a second fiber layer 114 and a core layer 116. The core layer 116 is disposed between the first fiber layer 112 and the second fiber layer 114. The second fiber layer 114 has a first region 110$b$, and a portion of the second fiber layer 114 on the first region 110$b$ is removed so that an area of the second fiber layer 114 is smaller than an area of the first fiber layer 112, and thus the second fiber layer 114 exposes the core layer 116 at the first region 110$b$. The resin component 120 is connected to the composite plate 110 and is combined with the core layer 116 at the first region 110$b$, wherein the resin component 120 is, for example, configured to be fixed at other component by means of locking or riveting.

Figure 2A:
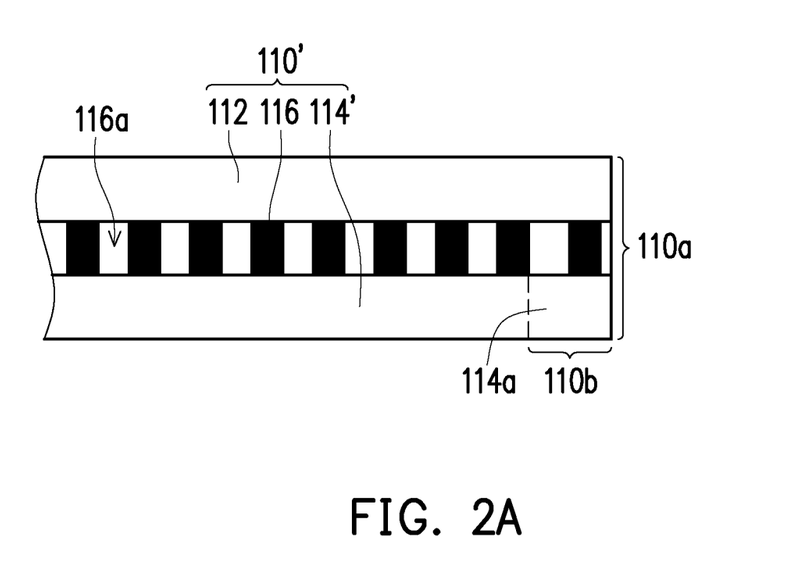
FIG. 2A to FIG. 2C illustrate a manufacturing process of the composite plate structure in FIG. 1.
Figure 2B:
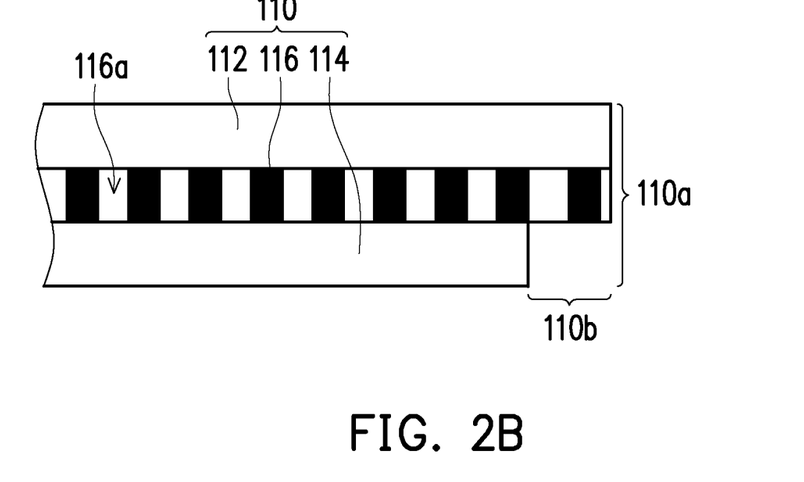

In the following, the manufacturing process of the composite plate structure 100 of the present embodiment is described with drawings. FIG. 2A to FIG. 2C illustrate a manufacturing process of the composite plate structure in FIG. 1. Firstly, as shown in FIG. 2A, a composite plate 110' is provided, wherein the composite plate 110' includes a first fiber layer 112, a second fiber layer 114' and a core layer 116, the core layer 116 is disposed between the first fiber layer 112 and the second fiber layer 114', and the core layer 116 is, for example, a honeycomb structure and has a plurality of openings 116$a$. With differences in product design, the openings on the core layer may have circular, triangular, square, or octagonal structural shapes and so forth, such that the core layer 116 is not limited to the honeycomb structure. Next, a portion 114$a$ of the second fiber layer 114' of FIG. 2A at the first region 110$b$ is removed to form the second fiber layer 114 shown in FIG. 2B, so that the core layer 116 is exposed by the second fiber layer 114 at the first region 110$b$.

Figure 2C:
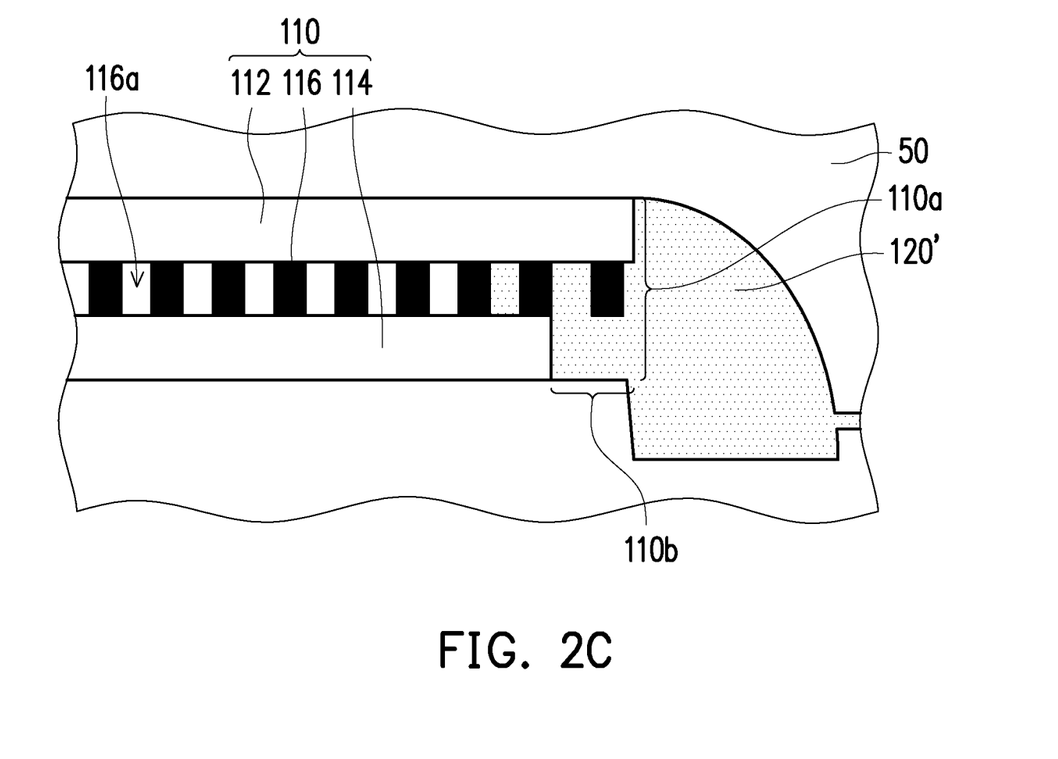

Then, as shown in FIG. 2C, the composite plate 110 is disposed in a mold 50, and a melted resin 120' is provided to the composite plate 110 by an injection molding process, wherein a portion of the melted resin 120' flows through the core layer 116 exposed by the second fiber layer 114 to a space between the first fiber layer 112 and the second fiber layer 114 and can flow into some of the openings 116$a$, and the melted resin 120' forms the resin component 120 connected to the composite plate 110, as shown in FIG. 1, after being cured.

With the above-described configurations and manufacturing method, the core layer 116 is exposed by the second fiber layer 114 at the first region 110$b$, so that the melted resin 120' can flow through the core layer 116 exposed by the second fiber layer 114 to a space between the first fiber layer 112 and the second fiber layer 114 during the injection molding process. As such, the resin component 120 formed by the cured melted resin 120' is combined with the core layer 116 at the first region 110$b$, so that a structural strength of the composite plate structure 100 is enhanced without requiring the use of additional adhesive to combine the resin component 120 and the composite plate 110.

In the present embodiment, the composite plate 110 has a sidewall 110a, the core layer 116 is exposed by the sidewall 110a, and the resin component 120 is connected to the sidewall 110a so as to be combined with the core layer 116 exposed by the sidewall 110a, and thereby further enhances the structural strength of the composite plate structure 100.

The composite plate structure 100 of the present embodiment, for example, is applied in the housing of portable electronic devices. In other embodiments, the composite plate structure 100 can be applied in other types of devices, such that the invention is not limited thereto. By removing the portion 114a (as illustrated in FIG. 2A) of the second fiber layer 114 at the first region 110b, the second fiber layer 114 and the resin component 120 located at the first region 110b can be fixedly combined and coplanar with each other, as shown in FIG. 1, a thickness of the composite plate structure 100 is reduced, and thereby complies with a slim design trend of the portable electronic devices. With differences in the product design, the resin component 120 located at the first region may also protrude out of the plane of the second fiber layer 114.

A material of the core layer 116 of the present embodiment can include plastic, bamboo slices, carbon fibers or glass fibers, and can be combined with the first fiber layer 112 and the second fiber layer 114 by a hot pressing process. In other embodiments, the material of the core layer 116 can include other appropriate synthetic fibers or natural fibers. In addition, in the present embodiment, the first fiber layer 112 and the second fiber layer 114 are, for example, fiber yarn bundle mixed resins, wherein the first fiber layer 112 and the second fiber layer 114 are, for example, fabricated by immersing fiber yarn bundles in a resin, and the resin, for example, is a thermoplastic resin or a thermosetting resin and is configured to flow into at least some of the openings 116a of the core layer 116 for adhering the core layer 116 with the first fiber layer 112 and the second fiber layer 114. A material of the first fiber layer 112 and the second fiber layer 114 can include carbon fibers, glass fibers or Kevlar fiber, and the invention is not limited thereto. In other embodiments, the material of the first fiber layer 112 and the second fiber layer 114 can include other appropriate synthetic fibers or natural fibers. In addition, in the other embodiments, the core layer 116 may also not include any opening 116a.

In addition to removing a portion of the second fiber layer 114 to expose the core layer 116, as described in the above, in the other embodiments, the core layer may also be exposed by the second fiber layer at the first region by adhering the second fiber layer with the core layer in a manner of misalignment and removing the resin on a surface of the exposed core layer, so that the resin component can be combined with the exposed core layer during the subsequent injection molding process.

Figure 3:
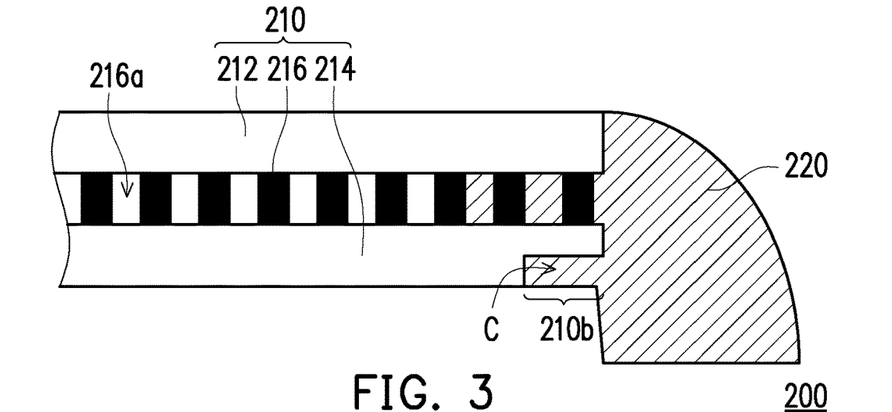
FIG. 3 is a schematic diagram illustrating a composite plate structure according to another embodiment of the invention.

In the embodiment shown in FIG. 1, the portion 114 a (as illustrated in FIG. 2A) of the second fiber layer 114 at the first region 110b is, for example, completely removed. However, the invention is not limited thereto, and an example, accompanied by a drawing, is described in the following. FIG. 3 is a schematic diagram illustrating a composite plate structure according to another embodiment of the invention. In the composite plate structure 200 of FIG. 3, configurations of a composite plate 210, a first fiber layer 212, a second fiber layer 214, a core layer 216, a plurality of openings 216a, a first region 210b, and a resin component 220 are similar to that of the composite plate 110, the first fiber layer 112, the second fiber layer 114, the core layer 116, the plurality of openings 116a, the first region 110b, and the resin component 120 of FIG. 1, and thus will not be repeated. A difference between the composite plate structure 200 and the composite plate structure 100 lies in that, the second fiber layer 214 at the first region 210b is partially removed to form a recess C, wherein because the second fiber layer 214 at the first region 210b is not completely removed, so that the core layer 216 at the first region 210b is covered by the second fiber layer 214. The recess C accommodates the resin component 220, so that the second fiber layer 214 is coplanar with the resin component 220 located in the first region 210b. With differences in the product design, the resin component 220 located at the first region may also protrude out of the plane of the second fiber layer 214.

Figure 4:
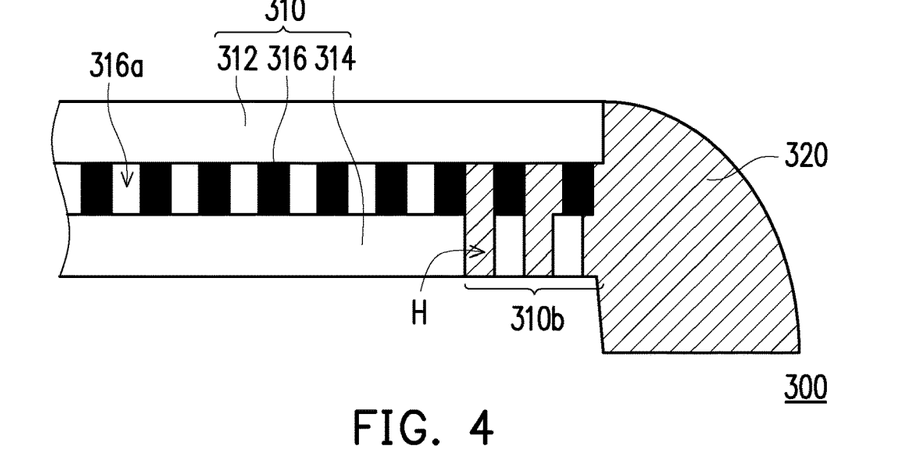
FIG. 4 is a schematic diagram illustrating a composite plate structure according to another embodiment of the invention.

In the embodiment shown in FIG. 1, the portion 114a (as illustrated in FIG. 2A) of second fiber layer 114 at the first region 110b is, for example, removed by a milling process. However, the invention is not limited thereto, and an example, accompanied by a drawing, is described in the following. FIG. 4 is a schematic diagram illustrating a composite plate structure according to another embodiment of the invention. In the composite plate structure 300 of FIG. 4, configurations of a composite plate 310, a first fiber layer 312, a second fiber layer 314, a core layer 316, a plurality of openings 316a, a first region 310b, and a resin component 320 are similar to that of the composite plate 110, the first fiber layer 112, the second fiber layer 114, the core layer 116, the plurality of openings 116a, the first region 110b, and resin component 120 of FIG. 1, and thus will not be repeated. A difference between the composite plate structure 300 and the composite plate structure 100 lies in that, a portion of the second fiber layer 314 at the first region 310b is partially removed by a laser perforation process or a mechanical drilling process, so as to form a plurality of holes H. The resin component 320 is extended into the core layer 316 through these holes H, so as to be firmly combined with the composite plate structure 300, and these holes H accommodate the resin component 320 so that the second fiber layer 314 is coplanar with the resin component 320 located at the first region 310b. With differences in the product design, the resin component 320 located in the first region may also protrude out of the plane of the second fiber layer 314.

Figure 5:
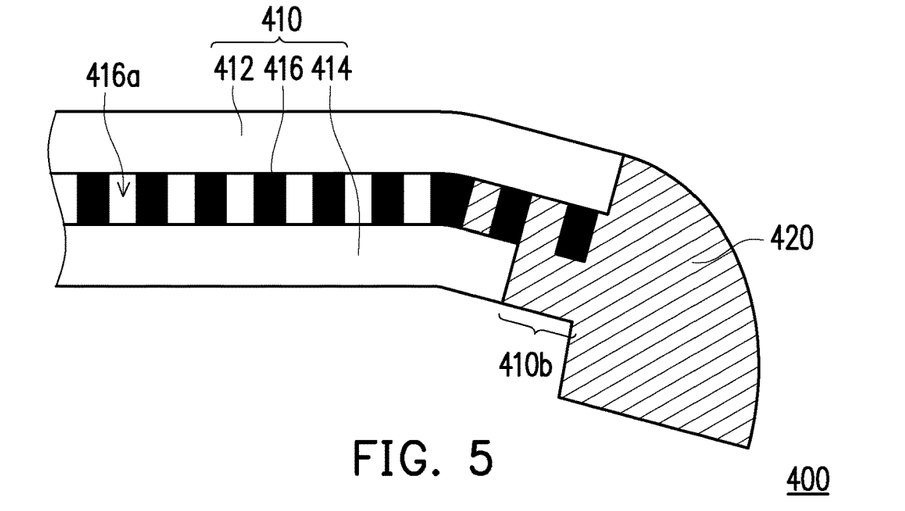
FIG. 5 is a schematic diagram illustrating a composite plate structure according to another embodiment of the invention.

In the embodiment shown in FIG. 1, composite plate 110 is flat rather than curved. However, the invention is not limited thereto, and an example, accompanied by a drawing, is described in the following. FIG. 5 is a schematic diagram illustrating a composite plate structure according to another embodiment of the invention. In the composite plate structure 400 of FIG. 5, configurations of a composite plate 410, a first fiber layer 412, a second fiber layer 414, a core layer 416, a plurality of openings 416a, a first region 410b, and a resin component 420 are similar to that of the composite plate 110, the plurality of openings 116a, the first fiber layer 112, the second fiber layer 114, the core layer 116, the first region 110b, and the resin component 120 of FIG. 1, and thus will not be repeated. A difference between the composite plate structure 400 and the composite plate structure 100 lies in that, an end of the composite plate 410 for connecting with the resin component 420 is curved, so that the composite plate structure 400, based on a design requirement, has a curved appearance.

Figure 6:
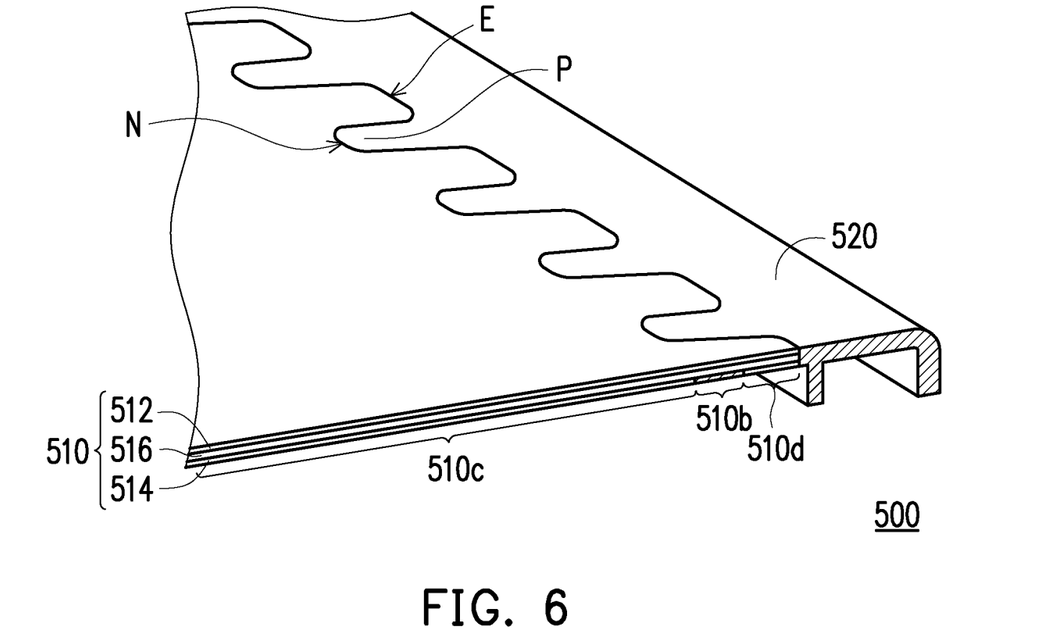
FIG. 6 is a partial perspective diagram illustrating a composite plate structure according to another embodiment of the invention.
Figure 7:
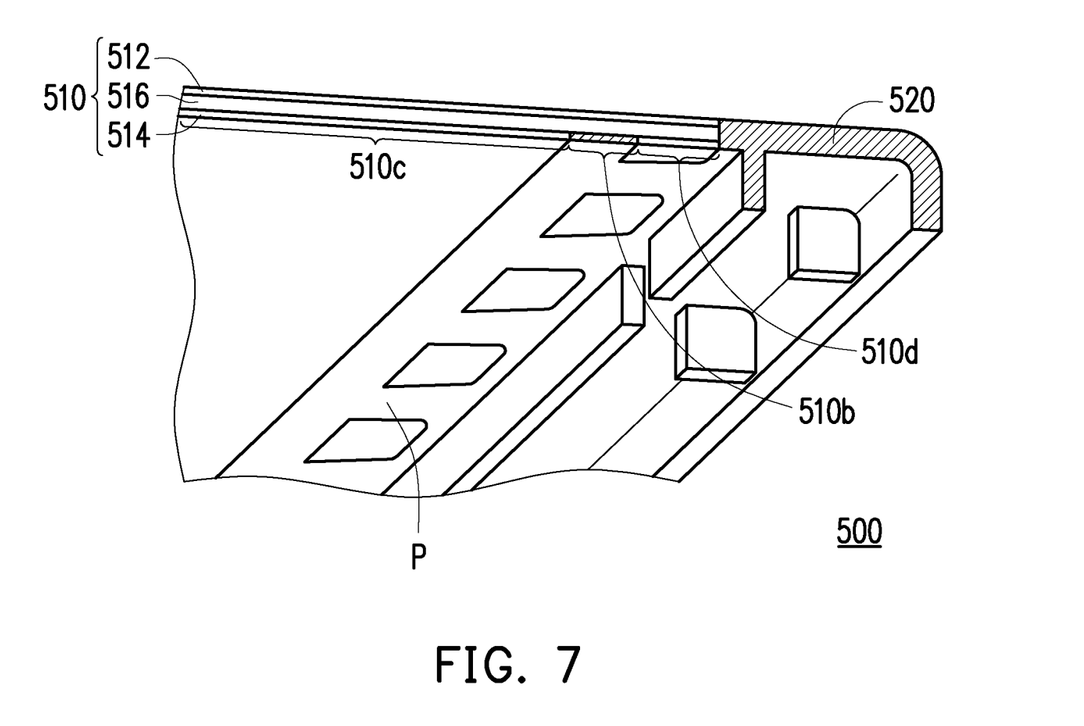
FIG. 7 is a partial perspective diagram illustrating the composite plate structure of FIG. 6 from another viewpoint.
Figure 8:
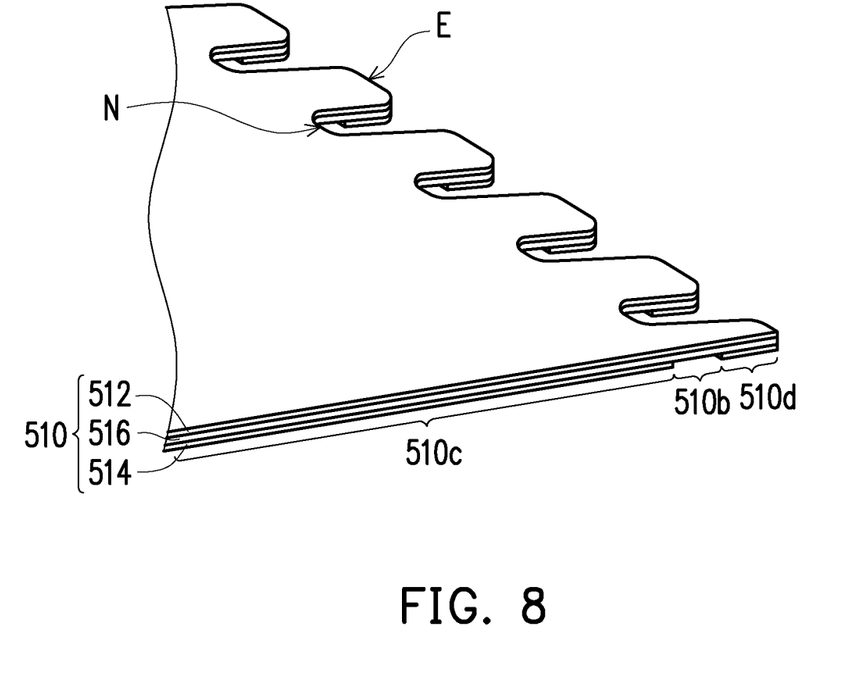
FIG. 8 is a partial perspective diagram illustrating the composite plate structure of FIG. 6.

In other embodiment, a peripheral edge of the composite plate may further be formed into a bumped shape by a punching process, so as to further enhance the binding force between the composite plate and the resin component. In the following, an example is provided with drawings. FIG. 6 is a partial perspective diagram illustrating a composite plate structure according to another embodiment of the invention. FIG. 7 is a partial perspective diagram illustrating the composite plate structure of FIG. 6 from another viewpoint. FIG. 8 is a partial perspective diagram illustrating the composite plate structure of FIG. 6. In the composite plate structure 500 of FIG. 6 to FIG. 8, configurations of a composite plate 510, a first fiber layer 512, a second fiber layer 514, a core layer 516, a first region 510b, and a resin component 520 are similar to that of the composite plate 110, the first fiber layer 112, the second fiber layer 114, the core layer 116, the first region 110b, and the resin component 120 of FIG. 1, and thus will not be repeated. A difference between the composite plate 510 and the composite plate 110 lies in that, a peripheral edge E of the composite plate 510 has a plurality of recessed portions N, the resin component 520 has a plurality of protruding portions P, and the protruding portions P are respectively fitted into the recessed portions N, so that the resin component 520 is tightly combined with the peripheral edge E of the composite plate 510. The recessed portions N of the composite plate 510 are, for example, formed by the punching process. When forming the resin component 520 at the peripheral edge E of the composite plate 510 by the injection molding process, the melted resin flows into the recessed portions N and is cured to form the protruding portions P of the resin component 520.

Figure 9:
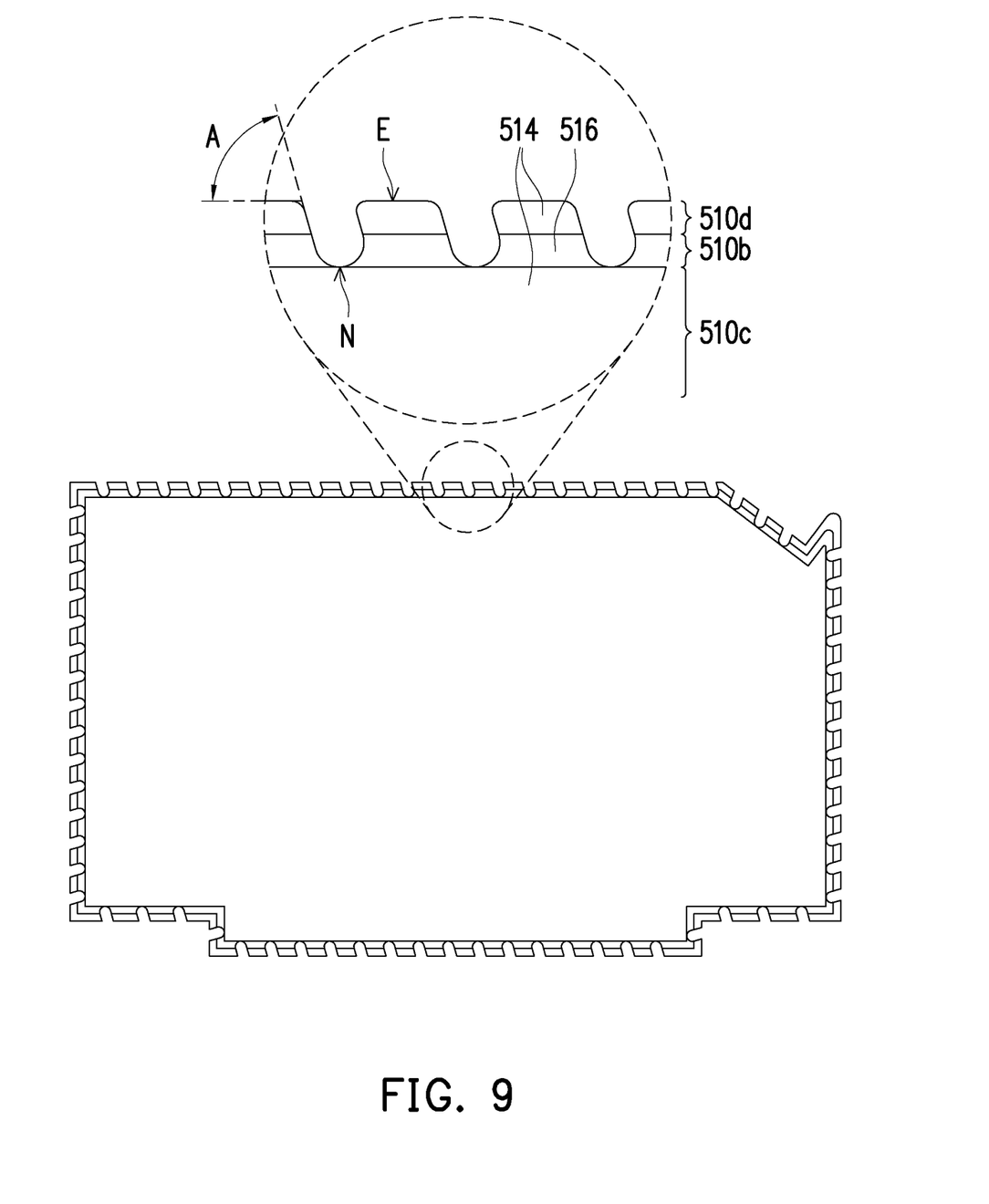
FIG. 9 is a bottom view of the composite plate of FIG. 8.

FIG. 9 is a bottom view of the composite plate of FIG. 8. Referring to FIG. 9, in the present embodiment, an extending direction of each of the recessed portions N has an inclination angle A relative to the peripheral edge E, so that the resin component 520 and the composite plate 510 have a stronger binding force at a direction perpendicular to the peripheral edge E. The inclination angle A is, for example, between 10 to 170 degrees, and more preferably is, between 10 to 60 degrees, but the invention is not limited thereto.

Similar to the composite plate 110 shown in FIG. 1, in which the second fiber layer 114 at the first region 110b is removed to expose the core layer 116, in the composite plate 510 of the present embodiment, the second fiber layer 514 at the first region 510b is also removed so as to expose the core layer 516. A difference between the first region 510b of the composite plate 510 and the first region 110b of the composite plate 110 lies in that, the first region 510b is not adjacent to the peripheral edge E of the composite plate 510. In detail, the first region 510b divides the second fiber layer 514 into a second region 510c and a third region 510d, the third region 510d is adjacent to the peripheral edge E, an area of the second region 510c is greater than an area of the third region 510d, and the core layer 516 is covered by the second fiber layer 514 at the second region 510c and the third region 510d. With differences in the product design, the first region 510b may also be adjacent to the peripheral edge E of the composite plate 510, namely, a region at where the portion of the second fiber layer 514 is removed may be adjacent to the peripheral edge E of the composite plate 510 and be located in the third region.

In summary, in the composite plate of the invention, the core layer is exposed by the second fiber layer at the first region, so that the melted resin can flow through the core layer exposed by the second fiber layer to a space between the first fiber layer and the second fiber layer. As such, the resin component, which is formed after the melted resin is cured, is combined with the core layer, the first fiber layer and the second fiber layer at the first region, so as to strengthen the binding forces of the core layer, the first fiber layer and the second fiber layer, and thereby enhances the structural strength of the composite plate structure. In addition, by removing the second fiber layer at the first region, the second fiber layer can be coplanar with the resin component located at the first region, the thickness of the composite plate structure is reduced, and thereby complies with the slim design trend of the portable electronic devices.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A composite plate structure, comprising:
a composite plate, comprising:
a first fiber layer;
a second fiber layer, having a first region, wherein an area of the second fiber layer is smaller than an area of the first fiber layer; and
a core layer, disposed between the first fiber layer and the second fiber layer, wherein the core layer is exposed at the first region; and
a resin component, connected to the composite plate, wherein the resin component is combined with the core layer at the first region,
wherein the core layer comprises a plurality of openings having a same height and each connected to the first fiber layer and the second fiber layer, and at least two of the plurality of openings are entirely filled with the resin component.

2. The composite plate structure as recited in claim 1, wherein the composite plate has a sidewall, the core layer is exposed by the sidewall, and the resin component is connected to the sidewall.

3. The composite plate structure as recited in claim 1, wherein the composite plate has a peripheral edge, the peripheral edge has a plurality of recessed portions, the resin component has a plurality of protruding portions, and the protruding portions are respectively fitted into the recessed portions.

4. The composite plate structure as recited in claim 3, wherein the recessed portions are formed by a punching process.

5. The composite plate structure as recited in claim 3, wherein an extending direction of each of the recessed portions has an inclination angle relative to the peripheral edge.

6. The composite plate structure as recited in claim 5, wherein the inclination angle is between 10 to 170 degrees.

7. The composite plate structure as recited in claim 1, wherein a portion of the second fiber layer is removed to expose the core layer at the first region, the first region divides the second fiber layer into a second region and a third region, and the core layer at the second region and the third region is covered by the second fiber layer.

8. The composite plate structure as recited in claim 7, wherein an area of the second region is greater than an area of the third region.

9. The composite plate structure as recited in claim 7, wherein the composite plate has a peripheral edge, and the third region is adjacent to the peripheral edge.

10. The composite plate structure as recited in claim 7, wherein the portion of the second fiber layer is removed by a laser perforation process.

11. The composite plate structure as recited in claim 1, wherein a material of the first fiber layer and the second fiber layer comprises carbon fibers, glass fibers, synthetic fibers, or natural fibers.

12. The composite plate structure as recited in claim 1, wherein a material of the first fiber layer and the second fiber layer comprises fiber yarn bundle mixed resin.

13. The composite plate structure as recited in claim 12, wherein the resin is a thermoplastic resin or a thermosetting resin.

14. The composite plate structure as recited in claim 1, wherein a material of the core layer comprises plastic, bamboo slices, carbon fibers, glass fibers, synthetic fibers, or natural fibers.

15. The composite plate structure as recited in claim 1, wherein the second fiber layer is coplanar with the resin component located at the first region.

* * * * *